US012111205B2

(12) United States Patent
Lescanne et al.

(10) Patent No.: US 12,111,205 B2
(45) Date of Patent: Oct. 8, 2024

(54) DEVICE AND METHOD FOR DETECTING SINGLE MICROWAVE PHOTONS

(71) Applicants: CENTRE NATIONAL DE LA RECHERCHE SCIENTIFIQUE, Paris (FR); SORBONNE UNIVERSITE, Paris (FR); COLLEGE DE FRANCE, Paris (FR); ECOLE NORMALE SUPERIEURE, Paris (FR)

(72) Inventors: Raphaël Lescanne, Le Kremelin-Bicetre (FR); Samuel Deleglise, Paris (FR); Emmanuel Flurin, Paris (FR); Zaki Leghtas, Paris (FR)

(73) Assignees: CENTRE NATIONAL DE LA RECHERCHE SCIENTIFIQUE, Paris (FR); SORBONNE UNIVERSITE, Paris (FR); COLLEGE DE FRANCE, Paris (FR); ECOLE NORMALE SUPERIEURE, Paris (FR)

( * ) Notice: Subject to any disclaimer, the term of this patent is extended or adjusted under 35 U.S.C. 154(b) by 624 days.

(21) Appl. No.: 17/414,588

(22) PCT Filed: Dec. 17, 2019

(86) PCT No.: PCT/EP2019/085695
§ 371 (c)(1),
(2) Date: Jun. 16, 2021

(87) PCT Pub. No.: WO2020/127299
PCT Pub. Date: Jun. 25, 2020

(65) Prior Publication Data
US 2022/0057261 A1   Feb. 24, 2022

(30) Foreign Application Priority Data
Dec. 19, 2018  (FR) ....................... 1873288

(51) Int. Cl.
*G01J 1/00* (2006.01)
*G01J 1/44* (2006.01)

(52) U.S. Cl.
CPC ........... *G01J 1/44* (2013.01); *G01J 2001/442* (2013.01)

(58) Field of Classification Search
CPC ....................................................... G01J 1/44
See application file for complete search history.

(56) References Cited

U.S. PATENT DOCUMENTS 9,680,452 B1 *  6/2017  Abdo ..................... G06N 10/00
9,806,711 B1 * 10/2017  Abdo ..................... G06N 10/00
(Continued)

OTHER PUBLICATIONS

Leghtas et al. "Confining the state of light to a quantum manifold by engineered two-photon loss," 20 (Year: 2015). Science 347, Issue 6224, pp. 853-857.*
(Continued)

*Primary Examiner* — Dani Fox
(74) *Attorney, Agent, or Firm* — Greer, Burns & Crain, Ltd

(57) ABSTRACT

A superconducting detection device for detecting a single microwave photon, including: —a quantum system with two energy levels of which the ground state and an excited state are controllable and detectable, the quantum system being designed to allow modulable three-wave interaction; —a buffer resonator arranged to receive an incident single microwave photon; —a highly dissipative auxiliary resonator arranged to discharge a photon; and —a reading device arranged to detect the state of the two-level quantum system; the buffer resonator and the auxiliary resonator are coupled to the quantum system; and the excited state of the quantum system and the photon of the auxiliary resonator are created in response to the reception of the incident photon in the buffer resonator and to the application of parametric pumping to the device. A method for detecting a single microwave photon implemented by a device according to the invention.

16 Claims, 3 Drawing Sheets

(56) References Cited

U.S. PATENT DOCUMENTS 10,541,659 B2 * 1/2020 Abdo ............... H03F 1/26
11,737,376 B2 * 8/2023 Frattini ............ H10N 60/12

OTHER PUBLICATIONS

Leghtas et al. "Supplementary Material for Confining the state of light to a quantum manifold by engineered two-photon loss," (Year: 2015).*
French Search Report received for Application No. 1873288, dated Nov. 8, 2019.
International Search Report and Written Opinion received for PCT/EP2019/085695, mailed Mar. 19, 2020.
Besse, J., et al., "Single-Shot Quantum Non-Demolition Detection of Itinerant Microwave Photons," arXiv:1711.11569v1, 2017, 8 pages.
Krantz, P., et al., "Single-shot Readout of a Superconducting Qubit using a Josephson Parametric Oscillator," arXiv:1508.02886v2, 2016, 12 pages.
Leghtas, Z., et al., "Confining the state of light to a quantum manifold by engineered two-photon loss," arXiv:1412.4633v1, 2014, 30 pages.
Sete, E., et al., "Quantum theory of a bandpass Purcell filter for qubit readout," arXiv:1504.06030v2, 2015, 15 pages.

* cited by examiner

DEVICE AND METHOD FOR DETECTING SINGLE MICROWAVE PHOTONS

BACKGROUND

The present invention relates to a device making it possible to detect single microwave photons, and a method for detecting single microwave photons implemented by this device.

The field of the invention comprises, non-limitatively, that of superconducting electronic devices.

The granularity of electromagnetic radiation is one of the manifestations of quantum physics. The detection of single photons makes it possible to distinguish instantly the presence of an electromagnetic excitation of the quantum vacuum state without the need to mediate the field fluctuations associated with each of these states. Such an instant detection of electromagnetic energy makes it possible to efficiently probe signals that are extremely weak, such as the primordial radiation generated by astrophysics phenomena such as the "big bang", or else that produced by the disintegration of novel particles, the existence of which could allow the enigma of dark matter to be solved. Finally, like any measurement on a quantum system, such a detection fundamentally modifies the system measured. In this case, it projects the field into a perfectly determined energy state. Thus, single-photon detectors are an essential component in quantum optics.

In the optical and infrared fields (frequency bands of approximately 400-800 THz and 300 GHz-400 THz, respectively), very high-performance single-photon detectors exist. They are used in particular for experiments in quantum optics, for example for preparing nonclassical states, for generating entanglement, or else for producing remote cryptographic shared keys. These detectors also have application in imaging and communication, such as long-distance quantum cryptography. In these examples, preparing a desired quantum state is subject to detecting an itinerant single photon.

Single-photon detectors are characterized by several variables. Their detection efficiency corresponds to the probability of having a detection signal when a photon arrives on the detector. Their dark noise takes account of the probability of having a detection signal when no photon arrives on the detector. Finally, the dead time or reset time is the waiting period after a detection before the detector is again ready to carry out a detection.

In the optical and infrared domains, single-photon detectors are characterized by very high detection efficiencies (close to unity), with low dark noise and quasi-continuous modes of operation.

In the microwave domain (frequency band approximately 1-20 GHz), photons are very difficult to detect due to their very low energy. No single-photon detector is commercially available. This frequency band requires working in a cryogenic environment (~10 mK) so that the thermal noise is well below the energy of a photon.

Demonstrations of principle have been proposed, based in particular on the conversion of the incident photon to be detected to an excitation of a quantum system with two energy levels (for example a quantum bit, or "qubit") the state of which can be measured. Detection takes place if the two-level system is found in its excited state. However, in quantum mechanics, the inverse process, namely the de-excitation of the two-level system to a propagating photon, also occurs. As this renders detection difficult, two main countermeasures have been proposed.

Firstly, the intensity of the conversion process can be modulated in order to capture the photon and trap it in the form of an excitation of the qubit. This method has the drawback that it is necessary to know precisely the temporal form of the photon and its time of arrival, in order to be able to capture it, which renders the detector unsuitable in many applications.

Secondly, the qubit state can be permanently measured. However, this tends to reduce the efficiency of detection and increase the dark noise.

Other architectures have been proposed, based on Ramsey interferometry. The parity of the photon number of the propagating wave packet is measured. There is a detection signal if a single photon arrives; on the other hand, if there are two incident photons no detection occurs. This is not a problem in the case of the single photon but tends to overestimate the efficiency of the detector by 50% for a small number of incident photons and can be limiting for some applications. In addition, the dark noise increases intrinsically with the length of the detection window, until reaching a probability of 50% for periods exceeding the lifetime of the qubit. In practice, this limits the maximum period during which the detector is "active" or "open" and compromises its capacity to detect photons with a significant time range. Finally, as interferometric measurement is necessarily delimited in time by a step of preparation of the qubit in a superposition state at the start and by a step of measurement on this same basis at the end, this method cannot be used when the source emits photons at perfectly random times.

The purpose of the invention is to resolve the aforementioned problems.

SUMMARY

An aim of the present invention is to propose a method and a system for detecting single microwave photons having low dark noise and high efficiency.

The purpose of the present invention is also to propose a method and a system for detecting single microwave photons that is not sensitive to the time of arrival or the temporal form of the incident photon, providing the latter is within the passband of the detector.

A further aim of the present invention is to propose a method and a device for detecting single microwave photons capable of operating with a short dead time.

At least one of these purposes is achieved with a superconducting device for detecting a single microwave photon, the device comprising:
  a quantum system with two energy levels, of which the ground state and an excited state are controllable and detectable, the quantum system being suitable for allowing a modulable three-wave interaction;
  a buffer resonator arranged to receive an incident single microwave photon;
  a highly dissipative auxiliary resonator arranged to discharge a photon; and
  readout means arranged for detecting the state of the two-level quantum system;
in which the buffer resonator and the auxiliary resonator are coupled to the quantum system, and in which the excited state of the quantum system and the photon of the auxiliary resonator are created in response to the reception of the incident photon in the buffer resonator and to the application of a parametric pumping to the device.

In the device, or detector, according to the invention, the frequency of the incident photon can be comprised between 1 and 20 GHz.

According to an advantageous embodiment, the quantum system can comprise a non-linear resonator.

According to an example, the non-linear resonator can comprise a quantum bit superconductor, for example of the transmon type.

Advantageously, the resonators can be respectively capacitively coupled to the quantum system.

Alternatively, the resonators can also be inductively coupled to the quantum system.

According to embodiments, the readout means can comprise a resonator. The latter can then correspond to one of the following resonators:
the auxiliary resonator;
a supplementary readout resonator.

According to an embodiment, the device according to the invention can also comprise frequency tuning means of the buffer resonator. Thus, in the case of a limited passband of the detector, the latter can be tuned to a range of a few GHz in order to receive photons of different frequencies.

According to an example, the frequency tuning means can comprise a SQUID (Superconducting QUantum Interference Device) incorporated in the buffer resonator for tuning the frequency.

According to an embodiment, the device according to the invention can also comprise filter means for the auxiliary resonator.

According to an example, the filter means can comprise a Purcell filter.

According to another aspect of the same invention, a method is proposed for the detection of single microwave photons, implemented by means of a superconducting detection device according to the invention. The method comprises the following steps:
receiving an incident single microwave photon (2) in the buffer resonator;
converting the incident photon to an excitation of the quantum system and a photon in the auxiliary resonator in response to the reception of the incident photon in the buffer resonator and to the application of a parametric pumping to the device; and
readout of the state of the quantum system.

The buffer resonator, the auxiliary resonator and the readout means are coupled to the quantum system. If an incident photon is in the passband of the buffer resonator, it can enter the latter. Then, the modulation of the three-wave interaction by the parametric pumping makes it possible to convert the photon of the buffer resonator to an excitation of the quantum system and a photon of the auxiliary resonator. The modulation frequency is chosen to render this conversion process resonant. The photon from the auxiliary resonator is then rapidly dissipated such that the reverse process, described above as a limitation, becomes disallowed. It is then sufficient to read the state of the quantum system in order to obtain a detection signal. If there was an incident photon, the quantum system will be in an excited state; if not, it will be in its ground state. The coherence properties of the quantum system do not affect the dark noise of the detector.

Within the framework of the present invention, application of the parametric pumping to the device means that the parametric pumping can be applied to the quantum system, to the buffer resonator or to the auxiliary resonator.

According to an embodiment, the readout step can be carried out by sending a microwave pulse to a readout resonator. If the readout resonator has a frequency different from that of the quantum system, it allows a dispersive readout of the quantum system to be made.

According to an embodiment, the auxiliary resonator can serve as a readout resonator.

According to a variant, a supplementary readout resonator can be coupled to the quantum system. Advantageously, when a supplementary readout resonator is comprised in the device according to the invention, the parametric pumping and the readout of the quantum system can be carried out simultaneously, which makes it possible to avoid the inefficiency associated with the coherence time of the quantum system. It is thus possible to obtain a detector capable of operating under a continuous regime.

Particularly advantageously, the method according to the invention can also comprise a step of resetting the quantum system carried out by simultaneous application of the parametric pumping and of a reset pulse on the auxiliary resonator.

In fact, after a detection, the quantum system is left in its excited state. For the detector to be able to carry out a new detection, it is necessary beforehand for the quantum system to be in its ground state, which involves a waiting time for the quantum system to relax since the last detection. This active reset step makes it possible to reduce the waiting time and therefore to reduce considerably the dead time of the detector.

The device and the method can each be used in metrology, cryptography, nanoscopic medical imaging or quantum calculation applications. The device can also be applied in radioastronomy, in particular to act as an ultrasensitive detector in radio telescopes or dark matter detectors.

BRIEF DESCRIPTION OF THE DRAWINGS

Other advantages and characteristics will become apparent on examining the detailed description of examples that are in no way limitative, and from the attached drawings, in which.

DETAILED DESCRIPTION

It is well understood that the embodiments that will be described hereinafter are in no way limitative. Variants of the invention can be envisaged in particular comprising only a selection of the characteristics described hereinafter, in isolation from the other characteristics described, if this selection of characteristics is sufficient to confer a technical advantage or to differentiate the invention with respect to the state of the prior art. This selection comprises at least one, preferably functional, characteristic without structural details, or with only a part of the structural details if this part alone is sufficient to confer a technical advantage or to differentiate the invention with respect to the state of the prior art.

In particular, all the variants and all the embodiments described can be combined together if there is no objection to this combination from a technical point of view.

In the figures, elements common to several figures retain the same reference.

Figure 1:
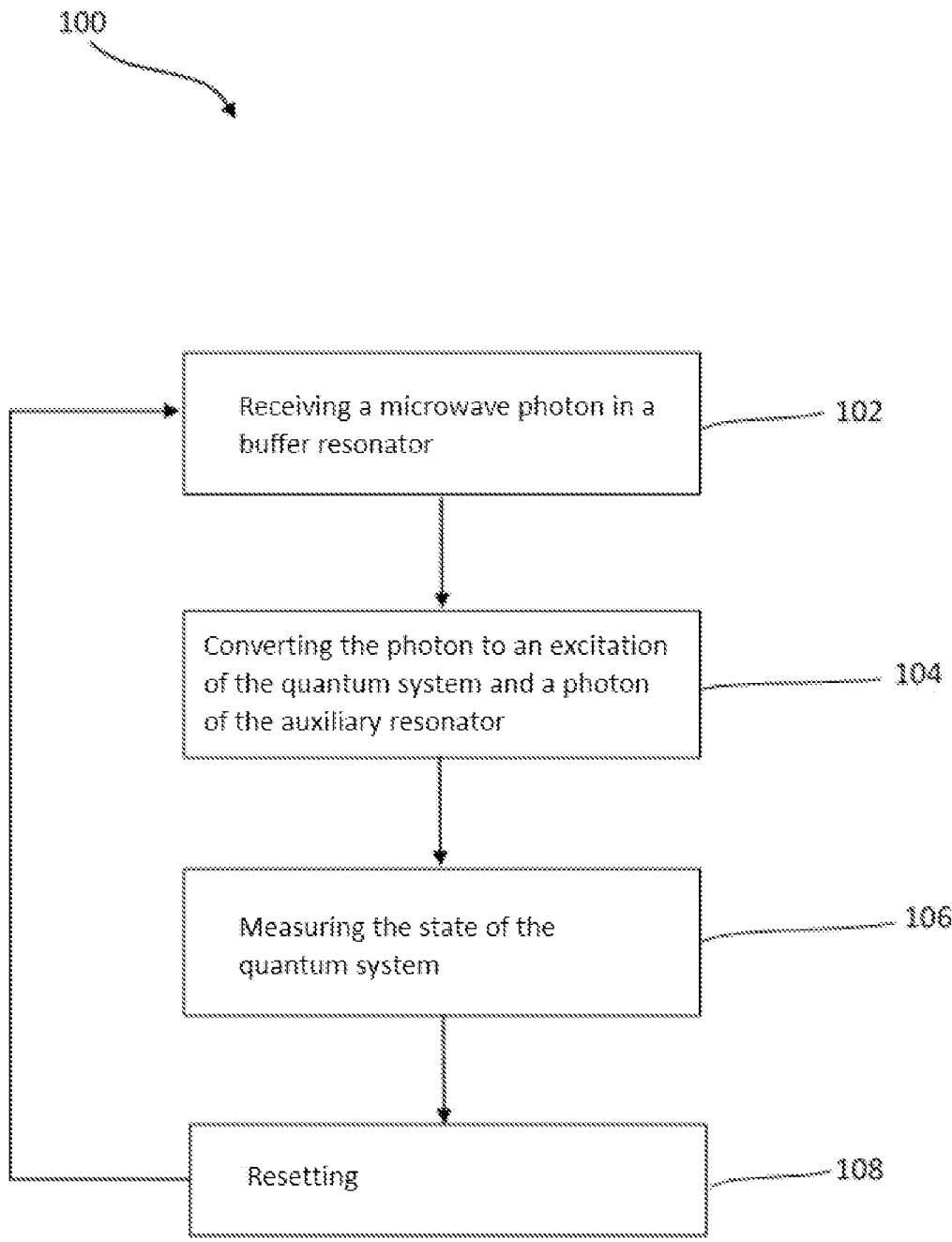
FIG. 1 is a diagrammatic representation of a non-limitative embodiment of a method according to the invention.

FIG. 1 is a diagrammatic representation of a non-limitative embodiment of a method according to the invention. The method 100 is implemented by means of a device according to the embodiments that will be described below with reference to FIGS. 2 and 3.

Figure 2:
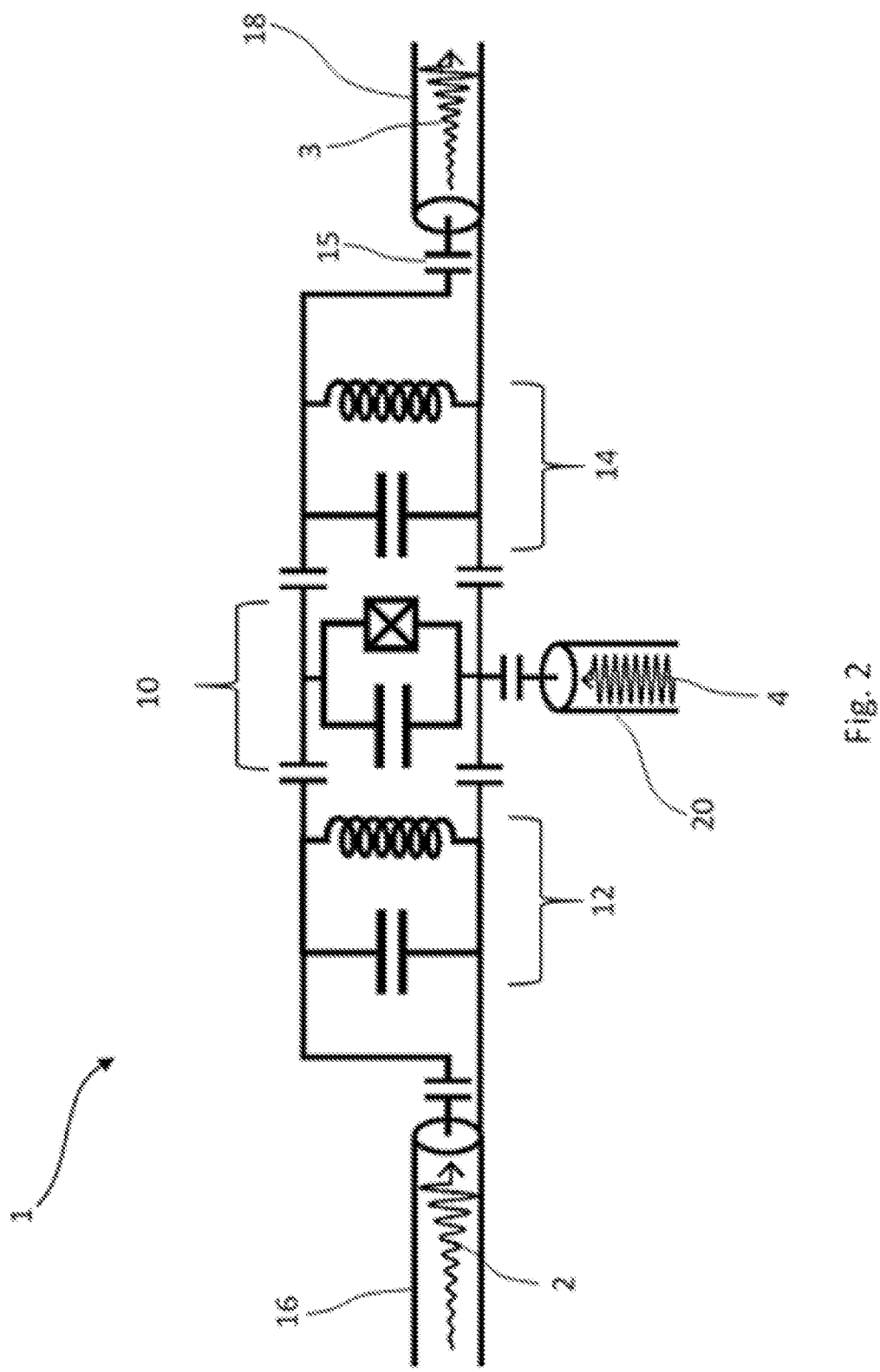
FIG. 2 is a diagrammatic representation of a non-limitative embodiment of a device according to the invention.

The device 1, shown in FIG. 2, comprises a first resonator 12, called buffer resonator, and a second resonator 14, called auxiliary resonator. These resonators are superconducting microwave resonators and are represented by a condenser arranged in parallel with an induction coil. The resonators 12, 14 can each be coupled to photon transmission lines 16, 18. The auxiliary resonator 14 is highly dissipative.

The two resonators 12, 14 are capacitively coupled to a superconducting qubit 10 represented by a condenser arranged in parallel with a Josephson junction. Two energy states of the qubit 10 can be isolated, the ground state and an excited state that are controllable and detectable.

The method 100, shown in FIG. 1, comprises a step 102 of reception of a single microwave photon in a superconducting resonator. This process can be represented by the creation operator $b^+$ of a photon in the buffer resonator, b representing the destruction operator. Receiving the photon takes place at a rate $\kappa_b$. As the buffer resonator has a frequency $\omega_b/2\pi$, a photon can be detected if it is in the frequency band $(\omega_b \pm \kappa_b/2)/2\pi$.

In parallel, by virtue of a conversion step 104, the photon collected in the buffer resonator is converted with a rate $\Gamma$ into two excitations: an excitation from the qubit and a photon from the auxiliary resonator. The two levels of the qubit are separated in energy by a quantity $\hbar\omega_q$, where $\hbar$ is the reduced Planck constant and $\omega_q/2\pi$ is the frequency of the qubit associated with the excited state. The auxiliary resonator has a frequency $\omega_w/2\pi$ and a dissipation rate $\kappa_w$. The excitation and de-excitation operators of the qubit are denoted respectively $q^+$ and q. The creation and destruction operators of a photon of the auxiliary resonator are denoted $w^+$ et w. This conversion is made possible because the qubit provides a Hamiltonian interaction in the following form:

$$\hat{H}_{int} = \hbar\varepsilon(t)(bq^\dagger w^\dagger + b^\dagger qw)$$ [Math. 1]

where $\varepsilon(t)$ represents a parameter capable of depending on time making it possible to modulate the intensity of this interaction. In order to render the conversion process resonant, it is sufficient to modulate the parameter $\varepsilon(t)$ with a frequency $\omega_p/2\pi$, $\varepsilon(t)=\varepsilon_0 \exp(i\omega_p t)$, so that:

$$\omega_p = \omega_q + \omega_w \omega_b$$ [Math. 2]

is satisfied. This equation represents what is called parametric pumping. The first term of the above Hamiltonian corresponds to the process described in step 104, namely the destruction of a photon in the buffer resonator accompanied by the excitation of the qubit and the creation of a photon in the auxiliary resonator with a rate:
[Math. 3]

$$\Gamma = \frac{4\varepsilon_0^2}{\kappa_w}.$$

The second term of the Hamiltonian corresponds to the reciprocal process: the destruction of a photon of the auxiliary resonator and of an excitation of the qubit accompanied by the creation of a photon in the buffer resonator. This second term renders the detection inefficient because it suppresses the excitation of the qubit which acts as detection syndrome and sends the incident photon into its transmission line. Typically, it is the term that limits the detectors based on simple conversion from the resonator to the qubit and requires $\varepsilon_0(t)$ to be modulated as a function of the time of arrival and of the temporal form of the incident photon.

The method 100 according to the present invention makes it possible to protect against this reciprocal process. In fact, the photon created in the auxiliary resonator is dissipated immediately after its creation with a rate $\kappa_w > \Gamma$. The state of the auxiliary resonator therefore remains close to vacuum. The inverse process that requires the presence of a photon in the auxiliary resonator is thus largely inhibited. The qubit then remains in its excited state after the passage of a photon, even if $\varepsilon_0$ is constant.

The detector according to the invention is considered as active during the entire period where $\varepsilon_0 \neq 0$, and inactive, or closed, otherwise.

For theoretical efficiency of the detector 1, $\kappa_b = \Gamma$ is necessary. According to the equation [Math. 3] in order to be within this regime, it is sufficient to pump the device with the correct amplitude $\varepsilon_0$. In order to achieve the regime $\kappa_b = \Gamma$, an optimization of the parameters of the device can be carried out.

The method 100 according to the invention comprises a step 106 of measurement, or readout, of the qubit. Once the state of the qubit is representative of the presence or absence of an incident photon, the qubit can be measured in order to obtain a detection signal. The step 106 can be carried out either after having closed the detector, therefore in the absence of pumping, if the auxiliary resonator is used as readout system of the qubit, or in parallel with the preceding steps otherwise. In the first case, if the detector is active for longer than the characteristic lifetime of the excited state of the qubit, the efficiency of detection starts to be limited by the latter.

To enable the method 100 and the device according to the invention to operate, it is necessary for the qubit to be in its ground state at the start of the method 100. A step 108 of resetting the detector is carried out so that it is ready to receive a new photon. To this end, the reciprocal process represented by the second term of $H_{int}$ is exploited. The effect of this process is to destroy an excitation of the qubit and a photon of the auxiliary resonator in order to create a photon in the buffer resonator. Only, even if this process is rendered resonant by parametric pumping, it is prevented if the auxiliary resonator is empty. In order to render the process possible and thus to de-excite the qubit, it is thus sufficient to excite the auxiliary resonator with a microwave pulse. The excitation of the qubit and the pulse on the auxiliary resonator will thus be converted to a photon in the buffer resonator which will dissipate rapidly in its transmission line. The detector is then ready for a new detection.

Alternatively, it is also possible to wait for the qubit to relax naturally to its ground state before proceeding to a new detection. However, the conversion rate of an active reset is much greater than the natural relaxation rate of the qubit, and there is thus a saving on the dead time of the detector. By way of example, the dead time can be of the order of a microsecond, while it would be several tens of microseconds without active reset.

If the emission of a photon by the input port of the detector is harmful to the operation of the photon source and the device contains a specific readout resonator, it is possible to use the latter to discharge the photon from the reset process. To this end, the pumping frequency is adjusted to ensure that the excitation of the qubit and the pulse on the auxiliary resonator are converted to a photon of the readout resonator.

FIG. 2 is the circuit diagram of a non-limitative embodiment of a device or detector according to the invention.

The device 1, shown in FIG. 2, comprises a first resonator 12, called buffer resonator, and a second resonator 14, called auxiliary resonator. These resonators are superconducting microwave resonators and are represented by a condenser arranged in parallel with an induction coil.

The buffer resonator 12 is capacitively coupled to an input transmission line 16 in which the incident photon 2 arrives. The buffer resonator 12 is coupled to the transmission line 16 with a rate $\kappa_b$. This passband can be increased by increasing the coupling capacitance. By way of example, $\kappa_b/2\pi$ can be of the order of 1 MHz.

The auxiliary resonator 14 is coupled to a transmission line 18 with a rate $\kappa_w$. It is a requirement for this resonator 14 to be highly dissipative, which can for example be carried out by a strong coupling of the resonator to the transmission line 18. By way of example, $\kappa_w/2\pi$ can be of the order of 3 MHz in the embodiment. This significant coupling can be obtained by virtue of a high coupling capacitance 15. The photon appearing in the auxiliary resonator 14 during the process of conversion described below therefore disappears rapidly in the transmission line 18 in the form of a photon 3.

The two resonators 12, 14 are capacitively coupled to a superconducting qubit 10 of the "transmon" (transmission line shunted plasma oscillation qubit) type represented by a condenser arranged in parallel with a Josephson junction. The name transmon implies a particular regime of parameters for the ratio between the energy associated with the junction $E_J$ and the energy of the condenser $E_C$ ($E_J/E_C \approx 50$) conferring on it significant coherence properties. The transmon 10 serves as a non-linear quantum system. Two energy states can be isolated therefrom, the ground state and an excited state that are controllable and detectable. These two levels are separated in energy by a quantity $\hbar\omega_q$. This transmon 10 also provides the modulable term of the three-wave interaction necessary for the operation of the detector. In the case of the transmon 10 this interaction is written:

$$\hat{H}_{int} = \hbar g_4 \alpha(t)(bq^\dagger w^\dagger + b^\dagger qw)$$ [Math. 4]

where $g_4$ is the amplitude of interaction with four stationary waves pertaining to the transmon 10 and $\alpha(t)$ represents the supplementary wave corresponding to the microwave field of parametric pumping 4 of amplitude $\alpha_0$ and of frequency $\omega_p$. This field is routed by a transmission line 20 weakly coupled to the transmon 10 to avoid superfluous dissipation of the latter.

The modulable three-wave interaction of the general case described above with $\varepsilon(t)=g_4\alpha(t)$ is effectively found. In order to open the detector 1, it is sufficient therefore to send a pump field, $\alpha_0 \neq 0$. If this pump is switched off, $\alpha_0=0$, the detector 1 is inactive or closed. For the transmon:

$$g_4 = \sqrt{\chi_b \chi_w},$$ [Math. 5]

with $\chi_b$, $\chi_w$ the dispersive offsets of the buffer and auxiliary resonators, respectively. They indicate the offset of the resonance frequencies of the resonators in the presence of an excitation of the qubit 10. In the example, these values are of several MHz.

In the case of the device 1 according to the embodiment in FIG. 2, after having opened the detector 1 for a fixed duration, it is possible to proceed to readout of the transmon (step 106 of the method 100 in FIG. 1). This readout is done according to a standard dispersive readout method making use of the fact that the frequency of the auxiliary resonator depends on the presence or absence of an excitation in the transmon 10. The frequency value of this dispersive offset is typically $\chi_w/2\pi=3$ MHz. It is thus possible to produce a spectroscopic measurement of the auxiliary resonator 14 in order to detect or not the frequency offset and thus to deduce the presence or absence of an excitation of the transmon 10. The spectroscopic measurement can be implemented by examining the phase acquired by a readout pulse, or readout signal, when it is reflected on the auxiliary resonator 14. This pulse, sent at the frequency $\omega_w - \chi_w/2$ via the transmission line 18, acquires a phase dependent on the frequency of the resonator 14. Measuring this phase by virtue of a series of amplifiers therefore gives access to the frequency of the auxiliary resonator 14 and thus to the state of the transmon 10.

According to particularly advantageous embodiments, the detection device 1 according to the invention can comprise supplementary readout means, filter means and/or means for tuning the resonance frequency of the buffer resonator.

Figure 3:
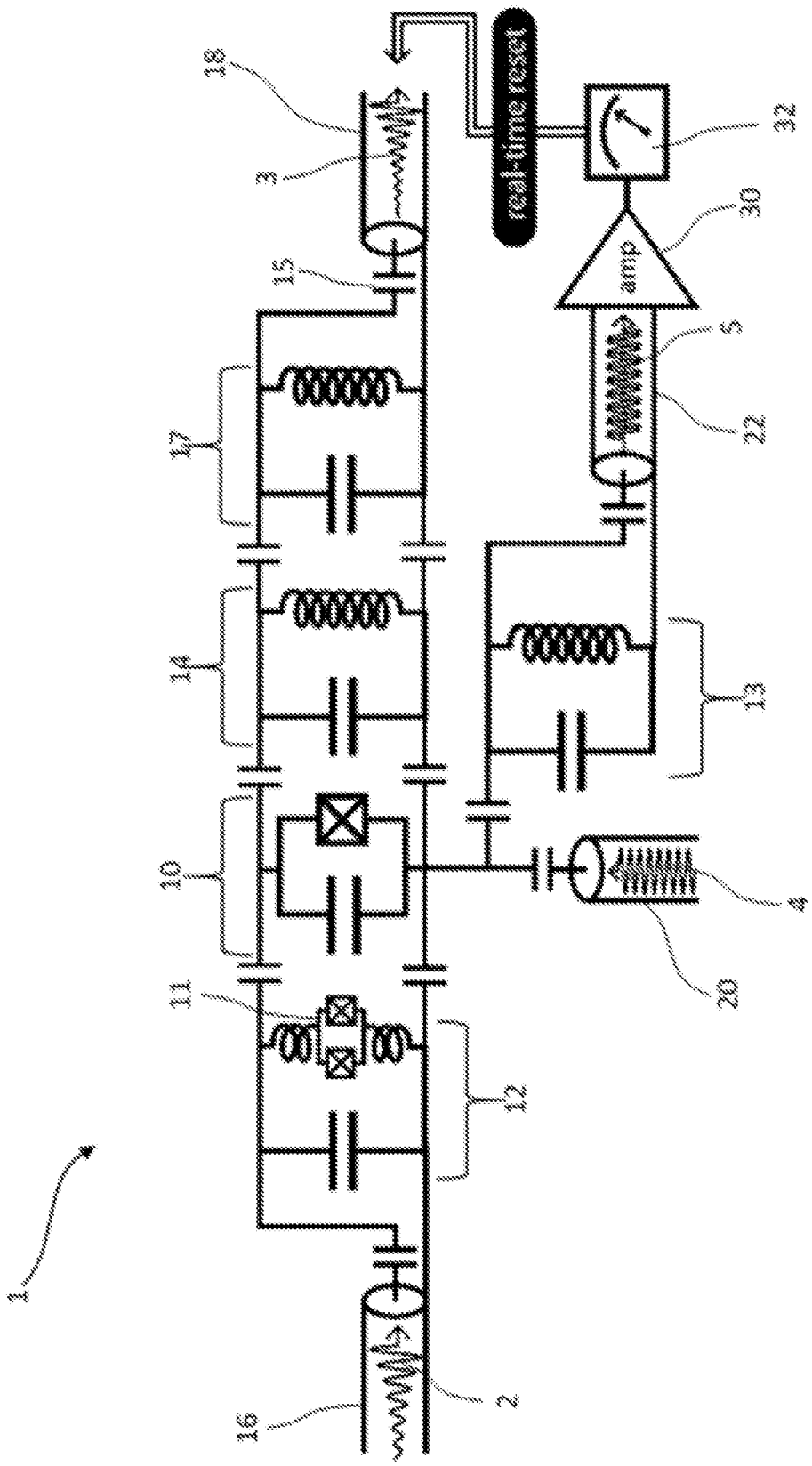
FIG. 3 is a diagrammatic representation of another non-limitative embodiment of a device according to the invention.

FIG. 3 is a circuit diagram of another non-limitative embodiment of a device according to the invention.

In this embodiment, represented in FIG. 3, the device 1 comprises supplementary components with respect to the embodiment described with reference to FIG. 1. The description of the components in FIG. 1 already described will not be repeated hereinafter. The supplementary components include filter means and tuning means.

The embodiment in FIG. 3 contains a supplementary readout resonator 13 capacitively coupled to the transmon 10. The addition of this supplementary readout resonator 13 makes it possible to carry out the readout of the qubit (step 106 of the method) in parallel with the conversion process (step 104 of the method).

Readout of the qubit remains a standard dispersive readout where a readout signal 5 is a continuous tone that flows in the transmission line 22 and is amplified by virtue of an amplification channel 30. In fact, contrary to the approaches based on Ramsey interferometry, the incident photons directly affect the energy state of the qubit (and not the phase of a superposition of state). Thus, the state of the qubit 10 can be continuously monitored without the need for the different steps of separation and recombination of the interferometry formed by the atomic levels.

A first benefit of the ability to read the transmon continuously is the avoidance of losses of efficiency associated with the finite lifetime of the excited state of the transmon. In fact, in the device according to the embodiment in FIG. 2, the detector 1 is active for a fixed duration. Even if the transmon 10 is excited during this period by an incident photon 2, the readout that takes place later can find it in its ground state as a result of the finite lifetime of the excited state. This leads to a reduction in the efficiency of the detector 1. In the device according to the embodiment in FIG. 3, the continuous readout makes it possible to avoid this inefficiency, as the qubit is permanently measured and therefore does not have the time to relax.

A second benefit of the continuous readout is detection of the photon in real time and therefore to be able to associate a timestamp with each detection.

Finally, unlike the approaches of the state of the art, such a continuous readout makes it possible to keep the detector active without any dead time until a photon is detected. Moreover, a real-time controller 32, shown in FIG. 3, can be used to reset the qubit to its ground state. according to step 108 of the method 100 according to the invention as soon as the qubit 10 is detected in the excited state.

According to the embodiment represented in FIG. 3, the filter means comprise a Purcell filter 17. This filter consists of a frequency resonator cow capacitively inserted between the auxiliary resonator 14 and the transmission line 18. The filter 17 also allows the photon from the auxiliary resonator 14 to be dissipated in the transmission line 18, while limiting the dissipation of the excitation of the transmon 10 by the transmission line 18.

According to the embodiment represented in FIG. 3, the tuning means comprise a SQUID 11 introduced in the buffer resonator 12. The SQUID 11 consists of two Josephson junctions arranged in parallel. By inducing a magnetic field in the SQUID, the inductance of the buffer resonator 12 can be adjusted, which makes it possible to vary the frequency of the buffer resonator 12. In order to induce the magnetic field in the SQUID 11, a current is routed close thereto in a rapid flux tube: a transmission line short-circuited to ground by a loop.

For manufacturing a device according to the invention, standard techniques can be implemented.

The device 1 according to the invention can be manufactured on a silicon (Si) plate covered by a layer of niobium (Nb) on which the qubit 10 and the resonators 12, 14 are produced by lithography according to known methods. The plate of Si can have a thickness of several hundred μm and the layer of Nb a thickness of approximately one hundred nm. The dimensions of the plate of Si are of several mm$^2$, for example 8×8 mm$^2$. The lengths of the resonators are chosen as a function of the desired frequencies.

The Josephson junction of the transmon 10 can be constituted by aluminium (Al) and can then be added by virtue of standard techniques. It can be a junction of the Al—AlOx-Al type (Ox meaning oxidized), manufactured by means of the Dolan bridge method. This method consists of a double angle evaporation with controlled oxidation making it possible to obtain a layer of AlOx of a few nm. Restoring contact between the
aluminium electrodes of the junction and the remainder of the circuit made of Nb is done by argon ion bombardment making it possible to remove the insulating layer of NbOx.

Of course, the invention is not limited to the examples that have just been described, and numerous modifications may be made to these examples without exceeding the scope of the invention.

The invention claimed is:

1. A superconducting device for detection of a single microwave photon, the device comprising:
   a quantum system with two energy levels, of which the ground state and an excited state are controllable and detectable, the transition between the ground and excited state having an angular frequency $\omega_q$;
   a buffer resonator arranged to receive an incident single microwave photon and having an angular frequency $\omega_b$;
   a dissipative auxiliary resonator arranged to discharge a photon at a rate $\kappa_w$ and having an angular frequency $\omega_w$; and
   readout means arranged for detecting the state of the two-level quantum system;
   in which the buffer resonator and the auxiliary resonator are coupled to the quantum system;
   the quantum system being suitable for allowing a modulable three-wave interaction between the buffer resonator, the auxiliary resonator, and the quantum system; and
   in which the excited state of the quantum system and the photon of the auxiliary resonator are created at a rate Γ, such that $Γ<\kappa_w$, in response to the reception of the incident photon in the buffer resonator and to the application of parametric pumping to the quantum system, to the buffer resonator, or to the auxiliary resonator, the parametric pumping being carried out by means of a microwave field having an angular frequency $\omega_p=\omega_q+\omega_w-\omega_b$.

2. The device according to claim 1, characterized in that the frequency of the incident photon is comprised between 1 and 20 GHz.

3. The device according to claim 1, characterized in that the quantum system comprises a non-linear resonator.

4. The device according to claim 3, characterized in that the non-linear resonator comprises a superconducting quantum bit of the transmon type.

5. The device according to claim 1, characterized in that the resonators are capacitively coupled to the quantum system.

6. The device according to claim 1, characterized in that the readout means comprise a resonator capacitively coupled to the quantum system.

7. The device according to claim 6, characterized in that the resonator is constituted by one of the following resonators:
   the auxiliary resonator; and
   a supplementary readout resonator.

8. The device according to claim 1, characterized in that it also comprises resonance frequency tuning means of the buffer resonator.

9. The device according to claim 8, characterized in that the frequency tuning means comprise a SQUID.

10. The device according to claim 1, characterized in that it also comprises filter means for the auxiliary resonator.

11. The device according to claim 10, characterized in that the filter means comprise a Purcell filter.

12. A method for detecting a single microwave photon, implemented by means of a superconducting detection device according to claim 1, characterized in that the method includes the following steps:
    receiving an incident single microwave photon in the buffer resonator;
    converting the incident photon to an excitation of the quantum system and a photon in the auxiliary resonator in response to the reception of the incident photon in the buffer resonator and to the application of a parametric pumping to the quantum system, to the buffer resonator, or to the auxiliary resonator, the parametric pumping being carried out by means of a microwave field having an angular frequency $\omega_p=\omega_q+\omega_w-\omega_b$; and
    readout of the state of the quantum system.

13. The method according to claim 12, characterized in that it also comprises a step of resetting the quantum system carried out by simultaneous application of a reset pulse on the auxiliary resonator and of the parametric pumping.

14. The method according to claim 12, characterized in that the readout step is carried out by application of a readout signal to the readout resonator.

15. The method according to claim 12, characterized in that the readout step of the mode of the quantum system is carried out by means of the auxiliary resonator as readout resonator.

16. The method according to claim 12, characterized in that the readout step of the mode of the quantum system is carried out by means of a supplementary readout resonator coupled to the quantum system.

* * * * *